3,077,434
SYNERGISTIC ANTHELMINTIC CONTAINING PIPERAZINES AND SENNOSIDES
Herbert Alan Ryan, Bedford Park, London, England, assignor to Westminster Laboratories Limited, London, England, a corporation of the United Kingdom
No Drawing. Filed May 21, 1959, Ser. No. 814,669
6 Claims. (Cl. 167—55)

Piperazine and its salts are used medicinally in the treatment of certain worm infections. However, it is necessary to use relatively large doses, the treatment being spread over several days; for example, for threadworms in human beings, as much as 200 grains of piperazine (or its equivalent of a piperazine salt) is required, commonly divided into doses of about 15 grains twice daily for seven consecutive days.

The object of the present invention is to improve the action of piperazine and its salts so that the desired effect in the treatment of threadworms and roundworms infections will be obtained with a smaller dosage.

This object is achieved, according to the invention, by providing a medicinal preparation containing piperazine or a salt thereof and also containing the active principles of senna sennosides A and B.

Such a preparation can be so effective that in the treatment of, for example, threadworm infestation in human beings, not more than about 60 grains of piperazine (or the equivalent amount of a piperazine salt) is required, and the period of administration may be reduced to one day. A further advantage is that substantially the same dosage is highly effective for the treatment of roundworms. Since both infections, threadworms and roundworms, commonly occur in the same person there is accordingly achieved a considerable simplification in treatment.

The active principles of senna to be incorporated in the preparation are suitably those in senna concentrates of the kinds described, for example, in British patent specifications Nos. 683,990, 744,876 and United States Patent No. 2,908,610.

A preferred senna concentrate is one standardised chemically and biologically to contain about 46 mg. per g. of sennosides A and B but other senna products suitably standardised may be used, whether prepared from pod or leaf or mixtures of pod and leaf or otherwise.

The preparation, containing piperazine, or salt thereof, and the senna product may be brought into any medicinal form suitable for administration, and with customary additional ingredients such as, for example, fillers, binders, flavouring and sweetening agents. Suitable forms include granules, powders, lozenges, capsules and compressed tablets.

There is preferably used piperazine phosphate but piperazine itself, or other salts suitable for medicinal use such as, for example, the citrate or tartrate may be used.

The relative amounts of piperazine and senna product are not critical. It generally suffices to have in the medicinal preparation according to the invention an amount of senna product such as to provide from 0.3 to 1.5 parts by weight of sennosides A and B, taken together, per 100 parts by weight of piperazine or the equivalent amount of piperazine salt.

The following examples are given for the purpose of illustrating the invention, the parts mentioned being parts by weight:

*Example 1.—Preparation in Granular Form*

38 parts powdered piperazine phosphate are mixed with 6.2 parts powdered senna pod concentrate standardised to contain 46 mg. per g. of sennosides A and B. To this mixture is added 54.5 parts sucrose, 0.18 part saccharin and 1.12 parts vanillin, and then wetted with 8 parts water. The uniformly wetted mass is passed through a No. 10 mesh sieve, the resulting granules being dried at about 115° F. About ninety-eight parts by weight of dry granules are obtained which are stored in well-sealed containers. These granules are very palatable and can either be eaten direct or mixed with milk or water and drunk as a beverage.

*Example 2.—Preparation in Compressed Tablet Form*

38 parts powdered piperazine phosphate are mixed with 6.2 parts powdered senna pod concentrate standardised to contain 46 mg. per g. of sennosides A and B. To this mixture is added 5 parts powdered lactose and 5 parts maize starch, and then wetted with 10 parts water. The uniformly wetted mass is passed through a No. 16 mesh sieve, the resulting granules being dried at about 115° F. About fifty-three parts granular material are obtained, which are then mixed with 0.25 part magnesium stearate, the resulting mixture being compressed into ½ inch diameter tablets each weighing 0.7 gramme.

What is claimed is:

1. The treatment of roundworm and threadworm infections in an animal host which comprises administering to said host synergistic admixture of a compound selected from the group consisting of piperazine and its medicinally acceptable anthelmintic salts and a senna product containing sennosides A and B.

2. The treatment of roundworm and threadworm infections in an animal host which comprises administering to said host a synergistic admixture of piperazine and a senna product containing sennosides A and B.

3. The treatment of roundworm and threadworm infections in an animal host which comprises administering to said host a synergistic admixture of piperazine phosphate and a senna product containing sennosides A and B.

4. The treatment of roundworm and threadworm infections in an animal host which comprises administering to said host a synergistic admixture of a senna product containing sennosides A and B and a compound selected from the group consisting of piperazine and its medicinally acceptable anthelmintic salts substantially in the ratio of from 0.3 to 1.5 units of weight of said sennosides to each 100 units of weight of said piperazine and 100 units of weight of the piperazine equivalent of said piperazine salts respectively.

5. The treatment of roundworm and threadworm infections in an animal host which comprises administering to said host a synergistic admixture of a senna product containing sennosides A and B and piperazine in the ratio of from 0.3 to 1.5 units of weight of said sennosides to 100 units of weight of said piperazine.

6. The treatment of roundworm and threadworm infections in an animal host which comprises administering to said host a synergistic admixture of a senna product containing sennosides A and B and piperazine phosphates substantially in the ratio of from 0.3 to 1.5 units of weight of said sennosides to 100 units of weight of the piperazine equivalent of said piperazine phosphates.

(References on following page)

References Cited in the file of this patent

UNITED STATES PATENTS 2,799,617     Forrest _____ July 16, 1957

OTHER REFERENCES

Fairbairn: Nature, LXVI, 1951, pages 918–925.
Fairbairn: J. Pharm. and Pharmacal, vol. 2, pages 807–830, 1950.
Fairbairn: J. Pharm. and Pharmacal, 10: Supplt. 217 T–226 T, December 1958.
Fairbairn: J. Pharm. and Pharmacal, 10: Supplt. 186 T–192 T, December 1958.
Sollmann: Manual of Pharmacology, pages 220–222, Saunders Co., 1957.
Merck Index, 7th ed., page 931.
Anchel: J. Biol. Chem. 177, page 169, 1949.
Auteroff: C.A. 47, page 6553(f), 1953.
Fairbairn: C.A. 44, page 288(a) (1950).
Kloss: Back to Eden, 1939, Longview Pub. House, Coalmont, Tenn., page 312.